United States Patent

Krishnan

[11] 4,095,637
[45] Jun. 20, 1978

[54] SOLID POLYURETHANE TIRE/WHEEL ASSEMBLY

[75] Inventor: Ram Murthy Krishnan, Stow, Ohio

[73] Assignee: The Goodyear Tire & Rubber Company, Akron, Ohio

[21] Appl. No.: 743,431

[22] Filed: Nov. 19, 1976

Related U.S. Application Data

[63] Continuation-in-part of Ser. No. 585,141, Jun. 9, 1975, abandoned.

[51] Int. Cl.² .................... B60C 1/00; C08G 18/32; C08K 5/12; B29D 3/02
[52] U.S. Cl. .................... 152/323; 260/75 NP; 260/75 NH; 260/77.5 AM; 260/31.8 W; 264/259; 264/265; 264/275; 152/357 A
[58] Field of Search .......... 260/77.5 AM, 75 NH, 260/75 NP, 31.8 W; 264/259, 265, 275; 152/323, 327 A

[56] References Cited

U.S. PATENT DOCUMENTS

| Re. 28,424 | 5/1975 | McGillvary | 260/77.5 AM |
| 2,665,521 | 1/1954 | Ford | 264/259 |
| 2,862,246 | 12/1958 | Sadler et al. | 264/275 |
| 2,998,403 | 8/1961 | Mueller | 260/45.4 |
| 3,004,939 | 10/1961 | Varvaro | 260/77.5 AM |
| 3,188,302 | 6/1965 | Lorenz | 260/77.5 AM |
| 3,348,597 | 10/1967 | Goldberg et al. | 260/2.5 AZ |
| 3,398,222 | 8/1968 | Kaufman et al. | 264/266 |
| 3,471,445 | 10/1969 | Carr | 260/77.5 AM |
| 3,755,261 | 8/1973 | Van Gulick | 260/77.5 AM |
| 3,891,606 | 6/1975 | Kogon | 260/77.5 AM |
| 3,980,606 | 9/1976 | Werner | 260/77.5 AM |
| 3,997,514 | 12/1976 | Kogon | 260/77.5 AM |

OTHER PUBLICATIONS

Condensed Chemical Dictionary, 5th Ed., Reinhold, New York (1956), p. 862.
Vieweg–Hoechtlen–Kunststoff–Handbuch, Band VII Polyurethanes, Carl Hanser, Munich, 1966, pp. 84–85.

*Primary Examiner*—H.S. Cockeram
*Attorney, Agent, or Firm*—H. C. Young, Jr.

[57] ABSTRACT

A substantially solid industrial polyurethane tire/wheel assembly where said polyurethane is prepared by reacting (A) a curative of 1,3-propane diol with a prepolymer of diphenylmethane-4,4'-diisocyanate and a polymeric polyol or (B) a curative complex of 4,4'-methylene dianiline with a prepolymer of a diisocyanate selected from diphenylmethane-4,4'-diisocyanate and toluene diisocyanate with a polymeric polyether polyol. It is an important feature of this invention that the selection of reactants involved, for the dianiline complex, a partial substitution of the polyether polyol with a polyether-ester polyol.

6 Claims, 2 Drawing Figures

SOLID POLYURETHANE TIRE/WHEEL ASSEMBLY

This application is a continuation-in-part of application Ser. No. 585,141, filed June 9, 1975, now abandoned.

This invention relates to substantially solid industrial wheels or tires. The invention particularly relates to resilient polyurethane solid tires and wheel combinations particularly suitable for use on vehicles adapted for transportation of goods from place to place within industrial manufacturing plant facilities.

Solid tires have heretofore been successfully prepared from selected polyester polyurethanes for industrial vehicles, such as fork lift trucks and slow speed vehicles used for transportation of materials and personnel. Such solid tires or wheel assemblies have been especially beneficial for this purpose since they have exhibited a long life for vehicular use at relatively low speeds without simply running flat from punctures and with resistance to cracking and chunking.

However, difficulties have been incurred in attempting to use polypropylene glycol-based polyether polyurethanes for solid industrial tires. Typically, such tires, or wheels, have been observed to have inferior physical properties for many applications and to many times fail by cracking early under load in resiliometer tests. Such results have been classified as low performance. Furthermore, shrinkages experienced with some of the solid tires, or wheels, in their preparatory mold has been observed to cause problems particularly relating to the requirement of finishing or trimming the prepared article.

Therefore, it is an object of this invention to provide a resilient, substantially solid polyether-type polyurethane industrial tire, or wheel assembly, suitable for use on industrial vehicles.

In accordance with this invention, a substantially solid industrial wheel having a polyurethane ground-contacting tire portion is provided where said polyurethane is prepared by the method which comprises (A) reacting a curative of 1,3-propane diol with a prepolymer of diphenylmethane-4,4'-diisocyanate and a polymeric polyol or (B) reacting a curative complex of 4,4'-methylene dianiline and a salt selected from sodium chloride, sodium bromide, sodium iodide, sodium nitrite, lithium chloride, lithium bromide, lithium iodide, lithium nitrite and sodium cyanide, where the mole ratio of said dianiline to said salt is about 3/1, with a prepolymer of a diisocyanate selected from (1) diphenylmethane-4,4'-diisocyanate and (2) toluene diisocyanate with a polymeric polyether polyol; where said polymeric polyol has a molecular weight in the range of about 800 to about 3200, preferably about 800 to about 2500, and a hydroxyl functionality in the range of about 2 to about 2.3, preferably about 2, and is comprised of (i) about 90 to about 100 weight percent polypropylene ether glycol when method (A) is used, (ii) about 30 to about 80 weight percent polypropylene ether glycol when method (B-1) is used or (iii) about 50 to about 100 weight percent when method (B-2) is used, where the corresponding remainder of said polymeric polyol is selected from at least one of (a) a polyether ester selected from a dialkyl glycol ester of a dicarboxylic acid, where said alkyl group is a saturated hydrocarbon radical containing 2 to 4 carbon atoms and where said dicarboxylic acid is selected from adipic acid, phthalic and terephthalic acid and (b) at least one polyester polyol derived from the reaction of a saturated hydrocarbon diol having 2 to 8, preferably 2 to 6, carbon atoms with a dicarboxylic acid selected from adipic acid, succinic acid, azelaic acid, phthalic acid, and terephthalic acid, where the ratio of isocyanato groups to hydroxyl groups of said polymeric polyols is in the range of about 1.5/1 to about 3/1, preferably about 1.7/1 to about 2.3/1 and where the ratio of sum of amino groups or hydroxyl groups of said curative to the excess isocyanato groups over said polymeric polyol hydroxyl groups is in the range of about 0.7/1 to about 1.2/1, preferably about 0.85/1 to about 0.95/1.

In the practice of this invention, it is preferred that the polyurethane ground-contacting portion of the solid wheel is prepared by reacting the selected curative with a polyurethane prepolymer of the selected diisocyanate and a polymeric polyol having a molecular weight in the range of about 800 to about 2500 and a hydroxyl functionality of about 2. For the preparation of the polyurethane prepolymer, a polyether ester is preferred which is preferably selected from diethylene glycol adipate and diethylene glycol phthalate. In the polyurethane itself, it is preferred that the ratio of isocyanato groups of said diisocyanate to hydroxyl groups of said polymeric polyols is in the range of about 1.7/1 to about 2.3/1 and where the ratio of hydroxyl groups of said 1,3-propane diol to excess isocyanato groups over said hydroxyl groups of polymeric polyols is in the range of about 0.85/1 to about 0.95/1.

Although the exact mechanism contributing to the operation and utility of the invention may not be thoroughly understood, it is believed that the result is due primarily to a balance of providing the development of a degree of crystallinity to generate sufficient physical properties such as tensile, tear and melting point during stress conditions while, at the same time, preventing the degree of crystallinity, or polarity, to become a substantial factor in promoting heat build-up and high hysterisis during stress conditions. Indeed, it is believed that it is the applicant's invention which provides sufficient balance to achieve the solid wheel or tire invention.

In the further practice of this invention, of the various polymeric polyols, generally representative of the polyether esters are the diethylene glycol, dipropylene glycol and dibutylene glycol esters of dicarboxylic acids such as adipic acid, isophthalic, phthalic and terephthalic acid. Representative of various polyester polyols are the products of a glycol such as ethylene glycol, 1,3-propane diol, 1,4-butane diol, neopentyl glycol, 1,6-hexane diol, 1,7-heptane diol with a dicarboxylic acid such as adipic acid, sebacic acid, azelaic acid, succinic acid, o-phthalic acid and p-phthalic acid. Generally, for such polyester polyols preferred hydrocarbon diols are ethylene glycol, 1,3-propane diol, 1,4-butane diol, neopentyl glycol and 1,6-hexane diol, where preferred dicarboxylic acids are adipic acid, sebacic acid and azelaic acid. It should be pointed out that generally the polyether ester polyols and polyester polyols are typified by having a relatively high aromaticity, such as in the range of about 25 to about 35 percent as represented by benzene content.

The cured polyurethane is typically and preferably characterized by having a compression set of about 15 to about 45 percent determined by ASTM D-395 Method B and a Goodrich flex life of about 15 minutes or more (ASTM D-623 test modified by having a 437 psi load at 38° C starting temperature and a 0.15 inch stroke). The cured polyurethane is preferably further characterized by having a 300 percent modulus in the range of about 1,000 to about 2500, preferably about 1200 to about 2100, as measured by an Instron tester with a cross head speed of about 20 inches per minute at about 25° C.

In the practice of this invention, it is particularly preferred that the industrial wheel is comprised of either the solid polyurethane or a rigid core, hub or rim containing an outer polyurethane ground-contacting portion. Generally, a rigid steel insert is desired in the center of the wheel for engaging an axle of an industrial vehicle and to facilitate mounting the tire.

In the further practice of this invention, it is generally preferred that the industrial tire is prepared by charging a suitable mold with a liquid mixture of (I) the 1,3-propane diol or a salt, such as sodium chloride, complex of 4,4'-methylene dianiline with (II) the reaction product of (A) diphenyl methane-4,4'-diisocyanate or toluene diisocyanate and (B) at least one of said polymeric polyols, or polymeric polyol mixtures, preferably having an average molecular weight in the range of about 800 to about 2500 and a hydroxyl functionality preferably in the range of about 2 to about 2.3.

More generally, the tire of this invention can conveniently be prepared by pouring or injecting the reaction mixture of polyurethane precursors into a suitable mold cavity and curing at a temperature in the range of about 80° C to about 150° C for a period of about 1 hour to about 24 hours. The actual curing period and temperature can be varied somewhat depending on both the chosen reactants and upon the size and configuration of the solid tire itself.

To facilitate ease of incorporation of the 4,4'-methylene dianiline complex curative, if used, into the polyurethane system, particularly with rapid mixing with an isocyanato-terminated polyurethane prepolymer, the complex can be conveniently and preferably first dispersed in a plasticizer. Generally such a complex dispersion contains about 50 to about 150, preferably about 60 to about 120, parts by weight plasticizer per 100 parts by weight complex. Representative of various preferably relatively chemically inert plasticizers include, for example, dioctyl phthalate, tetraethylene glycol di(2-ethylhexoate) and dibutoxyethoxyethyl formal. Dioctyl phthalate is preferred. Indeed, dioctyl phthalate especially enhances the ease of incorporation into the prepolymer and beneficially modifies and somewhat slows, or controls, the rate of curing of said prepolymer of a diisocyanate and selected polyester/polyether polyol mixture recipe.

The 4,4'-methylene dianiline complex can conveniently be prepared, for example, by mixing a dilute aqueous sodium salt solution with a solution of 4,4'-methylene dianiline in an alcohol, such as methanol or isopropanol, and allowing the mixture to react in about a 1:3 ratio of salt to methylene dianiline. The complex is recovered as a precipitate by ordinary means.

For further understanding of this invention, reference may be had to the accompanying drawing in which.

Figure 1:
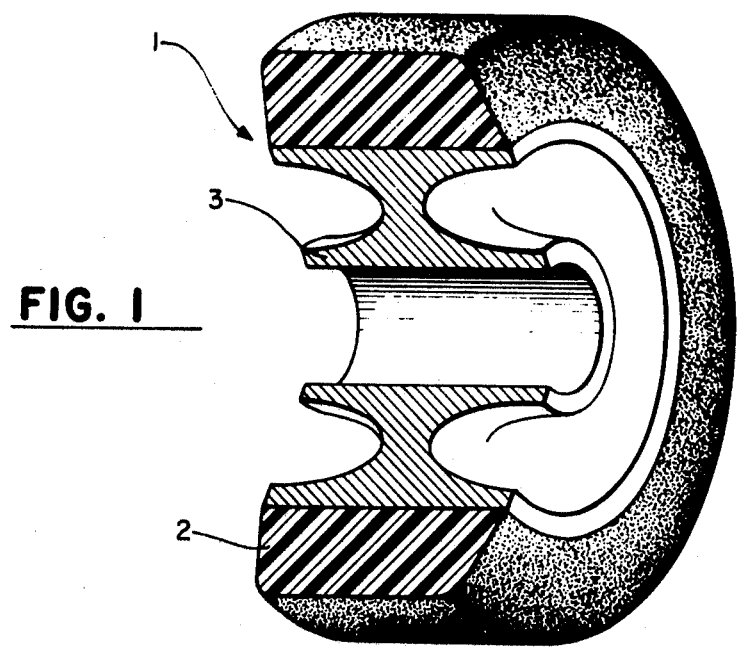
FIG. 1 is a perspective view having a cut-away portion illustrating a wheel consisting of a solid polyurethane tire fitted over a metal hub or rim.
Figure 2:
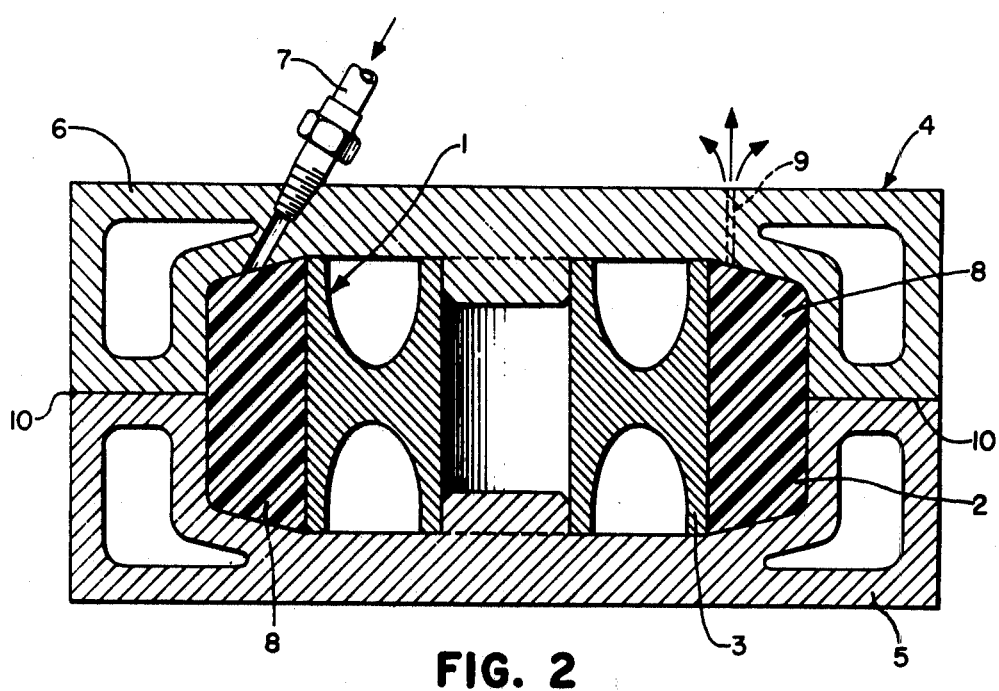
FIG. 2 is a vertical cross sectional view of such a wheel contained in a mold suitable for its preparation.

Referring to the drawing, the wheel 1 having the especially beneficial and unique solid polyurethane tire 2 adhered to the central core 3, which may also be termed a hub or rim, is shown. Such a wheel can conveniently be step wise prepared by fitting a hub 3 into a suitable mold 4 and particularly positioned in its bottom portion 5. The top portion 6 of the mold is then fitted over the hub 3 and the required polyurethane liquid precursors reaction mixture is gravity fed through an inlet nozzle 7 into the mold cavity surrounding the positioned hub 3. As the polyurethane reaction mixture 8 fills the mold cavity around the hub 3, air is allowed to exit or exhaust through a vent 9. The mold assembly 4 is placed in a hot air oven where the polyurethane reaction mixture 8 is allowed to cure for several hours at about 250° C. The mold assembly 4 is then removed from the oven, broken apart at its seam line 10 and the resulting wheel 1 removed and conveniently installed on the axle of an industrial vehicle, such as a fork lift truck.

The practice of this invention is further illustrated by reference to the following examples which are intended to be representative rather than restrictive of the scope of the invention. Unless otherwise indicated, all parts and percentages are by weight.

EXAMPLE I

Suitable concave molds for preparing a solid tire having outside diameters of about 10 and 15 inches, thicknesses of about 1½ and 5 inches, respectively, and inner diameters of about 7 and about 11¼ inches, respectively, were sprayed with a suitable release agent and assembled with a circular metal baseband positioned within adapted and shaped to fit the inner, otherwise void, diameters of the tires. The baseband had previously been painted with a suitable epoxy-based adhesive. The mold was preheated in an oven at about 66° C for about 1 hour. To the heated mold was charged a mixture of prepolymer and a curative of 1,3-propane diol or a dispersion of about a 1/1 weight ratio blend of the sodium chloride complex of 4,4'-methylene dianiline (MDA) and dioctyl phthalate. The complex dispersion was mixed thoroughly and strained through a cloth filter and heated to a temperature of about 45° C. Similarly, the 1,3-propane diol curative was used, maintaining the temperature between about 70°-80° C.

Both the prepolymer and the curative, or curative dispersion, had been charged through a casting machine and circulated therein at their respective temperatures so that their weight ratio for casting purposes was controlled and a desired curative diol or amine level was maintained.

The heated tire mold was taken out of the oven and filled with the prepolymer, curative dispersion mixture at a rate of about 6 to about 8 pounds per minute. Test samples of the reaction mixture were cast after the mold had been filled for representative sample physical testing and compound performance.

All cast parts were placed in hot air oven and cured at about 105° C. for about 16 to 22 hours. The mold was broken apart and the tire removed therefrom after a cure period of about 45 minutes. The resulting tire configuration was somewhat of a doughnut shape with the metal baseband adhered to its center portion similar to FIG. 1 of the drawings.

EXAMPLE II

Several tires were made according to the method of Example I and identified herein as Examples A–F. The recipes of the reaction mixture make-up, the results of the tests made upon the cast polyurethanes as well as the resiliometer tests of the tires themselves are more clearly shown in the following Tables 1-3.

groups over the OH groups of the polymeric polyol, more clearly represented as an OH/amine level, the

TABLE 1

| Compound | Example A | B | C | D | E | F |
|---|---|---|---|---|---|---|
| Ethylene glycol adipate/diphenyl methane-4,4'-diisocyanate prepolymer (NCO 6.6%) | — | — | — | — | — | 1200 |
| Polyethylene glycol adipate (1870) | — | — | — | — | 935 | — |
| Polypropylene glycol (1040) | 1040 | 2290.7 | 520 | 520 | — | — |
| Polypropylene glycol (2000) | — | 4558.6 | 800 | — | — | — |
| Diethylene glycol adipate (2000) | — | — | — | 1000 | — | — |
| Diethylene glycol phthalate (2000) | — | — | 300 | — | — | — |
| 80/20 2,6-; 2,4-toluene diisocyanate mixture | — | 1618 | — | — | 191.4 | — |
| Diphenylmethane-4,4'-diisocyanate | 625 | — | 545 | 504 | — | — |
| Trimethylol propane | — | — | — | — | — | 4.3 |
| 2,6-Ditertiary butyl pracresol | 10 | 68 | 15 | 15 | — | — |
| Stannous octoate solution (10% solution in 1000 mw ethylene glycol adipate or polypropylene glycol) | 0.1 | — | — | — | — | 0.13 |
| 4,4'-methylene bis orthochloroaniline | — | — | — | — | 129.5 | — |
| Hydroxyethyl hydroquinone | — | — | — | — | — | 165.72 |
| 1,3-Propane diole | 108.9 | — | — | — | — | — |
| Sodium chloride complx of 4,4'-methylene dianiline in dioctyl phthalate | — | 1785.6 | 409.8 | 378.8 | — | — |

In Table 1, Examples E and F are representative of the prior art formulations which have been typically used for the preparation of solid polyurethane tires in a number of instances. Example A represents a polyether polyurethane cured with 1,3-propane diol, C and D prepolymer/curative/curing temperatures in °C. and the pot life in minutes of the resulting polyurethane prepolymer/curative mixture. These values are representative of the corresponding Examples A-F of Table 1.

TABLE 2

| Value | Example A | B | C | D | E | F |
|---|---|---|---|---|---|---|
| OH/NCO ratio | 2.5 | 2.05 | 2.08 | 2.01 | 2.20 | 3.40 (estimated) |
| OH/amine group level | 0.95 | 0.85 | 0.85 | 0.85 | 0.85 | 0.91 |
| Prepolymer/curative/curing temperature (° C) | 104/93/121 | 91/38/121 | 93/35/121 | 93/35/121 | 105/110/110 | 105/120/121 |
| Pot life (minutes) | 4 | 3.5 | 2 to 3 | 2 to 3 | 2½ | 4 to 5 | represent polyether-ester polyurethane formulations. In Examples A-D, a small amount of 2,6-ditertiary butyl paracresol was included in the polyol to prevent its degradation. In Examples A and F, a small amount of stannous octoate was added as a catalyst. In Examples B and E, a mixture of 2,6- and 2,4-toluene diisocyanates was used in an 80/20 ratio. Examples B, C and D are cured with the sodium chloride complex, where B utilizes a polyether polyol and C and D utilize a polyether-polyester polyol mixture.

As being further descriptive of the polyurethane formulations of this invention and of the prior art-type formulations for solid polyurethane tires, Table 2 is presented to show the representative OH/NCO ratio, the ratio of OH or amine groups to excess isocyanate Analysis of the polyurethane formulations of Examples A-F as well as actual tire tests conducted on the representative solid polyurethane tire or wheel assembly are more clearly shown in the following Table 3. In the Table, Examples A-F correspond to Examples A-F of Table 1.

TABLE 3

| PHYSICAL TESTS | Examples A | B | C | D | E | F |
|---|---|---|---|---|---|---|
| Shore A/D hardness | 87/30 | 86/30 | 93/37 | 90/35 | 87/- | 94/44 |
| Modulus (25° C) 100% | 1130 | 670 | 1180 | 1050 | 914 | 1590 |
| Modulus (25° C) 300% | 2480 | 1170 | 1670 | 1550 | 1804 | 2360 |
| Modulus (25° C) 500% | — | 1970 | 2120 | 2100 | 4827 | 3250 |
| Ultimate tensile (psi) | 3050 | 2020 | 2890 | 3175 | 5400 | 4130 |
| Ultimate elongation (%) | 376 | 510 | 660 | 635 | 508 | 600 |
| 30% Compression (Hystersis) (% loss) | 12 | 32.7 | 27 | 28 | 19.3 | 24 |
| Compression set (%) ASTM D-935 Method B | 45 | 39.8 | 16.8 | 22 | 23.2 | 26.2 |
| Crescent tear (ASTM D-624) Die C (lb/in) | 375 | 323 | 503 | 500 | 464 | 746 |
| 30% Compression Load Deflection (lbs/in²) | 1000 | 800 | 1825 | 1408 | 1110 | 2040 |
| Goodrich flex life (modified) (ASTM D-623 with 437 psi load starting at 38° C) Time (min) | 15+ | 5 | 15+ | 15+ | 42.5 | 5 |
| Heat rise (° F) | 145 | 174 | 164 | 159 | 176 | 169 |
| Softening Point (° C) | 178 | 209 | 200 | 210 | 214 | 216 |
| Melting Point (° C) | 188 | 279 | 280 | 280 | 251 | 222 |
| TIRE TEST (15 × 5 × 11¼ Inch Tire) Resiliometer results Load at failure (lbs) | 6600 | 6600 | 5500 | 7700 | 6600 | 6600 |
| Time (hrs) | 32 | 31.7 | 35.6 | 78.5 | 38.5 | 57 |

For the resiliometer tests shown in Table 3, the tire or wheel assembly was mounted on a resiliometer and run at 3 mph. Initially, a load of 2200 pounds for 2 hours was applied and then 4400 pounds for 4 hours were put on the tire as a load. The test was continued at a load increment increase of 1100 pounds after every 24 hours until a blow out or failure would occur. A minimum load of 5500 pounds for a total run time of about 30 hours is generally considered satisfactory. Thus, the resiliometer test of the sample of the tire, or wheel assembly, of these experiments demonstrated that such tires can support an incrementally increased load of up to about 7700 pounds for at least about 65 hours at a speed of about 3 mph.

It should be pointed out, in the practice of this invention, that although for the diamine complex-cured tire, toluene diisocyanate was used relatively easily with success with the polyether-type polyols, the diphenylmethane-4,4'-diisocyanate was used only with difficulty. In this regard, it is an important feature of this invention that, for the diamine complex-cured polyurethane, the polyether polyol must be at least partially substituted with a polyether polyester.

In view of this discovery, it should be further pointed out that it is an important and preferred feature of this invention that the polyurethane be prepared as a reaction product of the diamine complex with a salt, such as sodium chloride, and reacted with a prepolymer prepared from diphenylmethane-4,4'-diisocyanate mixture of polypropylene ether glycol and a polyether ester such as diethylene glycol adipate or o-phthalate or their mixtures. Indeed, such a reaction product has been found to be especially beneficial from the pound/volume standpoint by having a specific gravity of about 1.17 as compared to more typical polyurethane formulations having a specific gravity in the range of about 1.25. Moreover, in the instance of a solid polyurethane wheel or wheel having a solid polyurethane tire portion, an especially enhanced traction and soft ride characteristic is provided.

In the description of this invention, the solid tire is prepared by the well known prepolymer-type technique. In this technique the polyol is conveniently reacted with the diisocyanate at a temperature in the range of about 70° C. to about 130° C. to form a prepolymer with an R value in the range of about 1.8 to about 4, preferably about 2 to about 2.5. The R value is the OH/NCO ratio of the reactants. Generally, the polyol is first degassed to remove moisture. The reaction time for essential completion varies, depending somewhat upon the reactants and temperature, such as in the range of about 20 to about 45 minutes.

While certain representative embodiments and details have been shown for the purpose of illustrating the invention, it will be apparent to those skilled in this art that various changes and modifications may be made therein without departing from the spirit or scope of the invention.

What is claimed is:

1. A solid industrial polyurethane tire where said polyurethane is prepared by reacting (A) a curative of 1,3-propane diol with a prepolymer of diphenylmethane-4,4'-diisocyanate and a polymeric polyol or (B) a curative complex of 4,4'-methylene dianiline and a salt selected from sodium chloride, sodium bromide, sodium iodide, sodium nitrite, lithium chloride, lithium bromide, lithium iodide, lithium nitrite and sodium cyanide, where said salt is first dispersed in a plasticizer selected from at least one of dioctyl phthalate, tetraethylene glycol di(2-ethylhexoate) and dibutoxyethoxyethyl formal, with a prepolymer of a diisocyanate selected from (1) diphenylmethane-4,4'-diisocyanate and (2) toluene diisocyanate with a polymeric polyether polyol; where said polymeric polyol has a molecular weight in the range of about 800 to about 2500 comprised of polypropylene ether glycol in the amount of (i) about 90 to about 100 weight percent when combination (A) is used, (ii) about 30 to about 80 weight percent when combination (B-1) is used or (iii) about 50 to about 100 weight percent when combination (B-2) is used, where the corresponding remainder of said polymeric polyol is selected from at least one of (a) a polyether ester selected from at least one of diethylene glycol, dipropylene glycol and dibutylene glycol ester of a dicarboxylic acid selected from at least one of adipic acid, isophthalic acid, phthalic acid and terephthalic acid and (b) at least one polyester polyol derived from a saturated hydrocarbon diol having 2 to 6 carbon atoms and a dicarboxylic acid selected from at least one of adipic, succinic, azelaic, phthalic and terephthalic acids, where the ratio of isocyanato groups to hydroxyl groups of said polymeric polyols is in the range of about 1.7/1 to about 2.3/1 and where the ratio of sum of hydroxyl groups of said 1,3-propane diol, if used, and amine groups of said 4,4'-methylene dianiline complex, if used, to the excess isocyanato groups over said polymeric polyol hydroxyl groups is in the range of about 0.8/1 to about 1.1/1, said tire characterized by (A) a polyurethane having a compression set of about 15 to about 45 percent determined by ASTM D-395 Method B and a Goodrich flex life of about 15 minutes or more (ASTM D-623 test modified by having a 437 psi load at 38° C. starting temperature and a 0.15 inch stroke, or (B) capable of supporting an incrementally increased load up to at least about 7700 pounds for at least about 65 hours at a speed of about 3 miles per hour when said wheel assembly has a ground contacting tire portion with an outside diameter of about 15 inches, a width of about 5 inches and an inside diameter of about 11 inches adhered to a steel centered core.

2. The tire of claim 1 comprising a substantially solid industrial wheel containing a solid polyurethane ground contacting portion, where said polyurethane ground contacting portion is prepared by reacting 1,3-propane diol with the reaction product of a diisocyanate selected from diphenyl methane-4,4'-diisocyanate and a mixture of 2,4- and 2,6-toluene diisocyantes with at least one polymeric polyol having a molecular weight in the range of about 800 to about 2500 comprised of about 50 to about 90 weight percent polypropylene ether glycol and, correspondingly, about 50 to about 10 weight percent of a polyether ester selected from diethylene glycol adipate and diethylene glycol isophthalate, where the ratio of isocyanato groups of said diisocyanate to hydroxyl groups of said polymeric polyols is in the range of about 1.7/1 to about 2.3/1 and where the ratio of hydroxyl groups of said 1,3-propane diol to excess isocyanato groups over said hydroxyl groups of polymeric polyols is in the range of about 0.85/1 to about 0.95/1.

3. The tire of claim 1 where, in said polyurethane, said polyether esters are selected from at least one of the diethylene glycol, dipropylene glycol and dibutylene glycol esters of dicarboxylic acids selected from adipic acid, terephthalic acid and isophthalic acid, and where said polyester polyols are selected from the product of at least one glycol selected from ethylene glycol, 1,3-propane diol, 1,4-butane diol, neopentyl glycol, 1,6-hexane diol, 1,7-heptane diol with a dicarboxylic acid selected from adipic acid, sebacic acid, azelaic acid, succinic acid, phthalic acid and terephthalic acid.

4. The tire of claim 1, where in the preparation of said polyurethane, said diamine is first dispersed in dioctyl phthalate, and where said diamine is a complex of sodium chloride and 4,4'-methylene dianiline.

5. A solid industrial polyurethane tire according to claim 1 adhered to a centered rigid core to form a wheel assembly, said core adapted to fit on an axle of an industrial vehicle, and said polyurethane tire constituting the ground contacting portion of said wheel assembly, and where, in the preparation of said polyurethane, the ratio of isocyanato groups to hydroxyl groups of said polymeric polyols is in the range of about 1.7/1 to about 2.3/1 and the ratio of the sum of hydroxyl and amine groups of said 1,3-propane diol, if used, and diamine complex, is used, curative to excess isocyanato groups is in the range of about 0.85/1 to about 0.95/1.

6. The method of preparing the solid polyurethane tire of claim 1 which comprises applying the polyurethane precursors, as a fluid reaction mixture, into a mold cavity in which a rigid centered core member has been inserted, curing said reaction mixture at a temperature in the range of about 80° C to about 150° C to form the resilient polyurethane tire portion adhered to the rigid core member, thereby defining a tire/wheel assembly, and removing said tire with its adhering core member from the mold.

* * * * *